US008065192B2

(12) United States Patent
Johansson et al.

(10) Patent No.: US 8,065,192 B2
(45) Date of Patent: Nov. 22, 2011

(54) METHOD AND SYSTEM FOR TIERED PRICING OF CUSTOMIZED BASE PRODUCTS

(75) Inventors: Henrik Johansson, Austin, TX (US); Jason Black, Austin, TX (US)

(73) Assignee: Boundless Network, Austin, TX (US)

( * ) Notice: Subject to any disclaimer, the term of this patent is extended or adjusted under 35 U.S.C. 154(b) by 796 days.

(21) Appl. No.: 11/901,032

(22) Filed: Sep. 14, 2007

(65) Prior Publication Data

US 2009/0043670 A1 Feb. 12, 2009

Related U.S. Application Data

(60) Provisional application No. 60/844,566, filed on Sep. 14, 2006.

(51) Int. Cl.
*G06Q 30/00* (2006.01)
(52) U.S. Cl. ...................... 705/26.2; 705/26.5
(58) Field of Classification Search .............. 705/26.2, 705/26.5, 26, 27
See application file for complete search history.

(56) References Cited

U.S. PATENT DOCUMENTS

| | | | | |
|---|---|---|---|---|
| 5,897,622 A * | 4/1999 | Blinn et al. | ...... | 705/26 |
| 6,260,024 B1 * | 7/2001 | Shkedy | ...... | 705/37 |
| 6,269,343 B1 * | 7/2001 | Pallakoff | ...... | 705/26 |
| 6,584,451 B1 * | 6/2003 | Shoham et al. | ...... | 705/37 |
| 6,876,983 B1 * | 4/2005 | Goddard | ...... | 705/37 |
| 7,127,415 B1 * | 10/2006 | Verchere | ...... | 705/26 |
| 7,191,145 B1 | 3/2007 | Lunetta et al. | | |
| 7,363,246 B1 * | 4/2008 | Van Horn et al. | ...... | 705/26 |
| 7,467,103 B1 * | 12/2008 | Murray et al. | ...... | 705/26 |
| 7,480,627 B1 * | 1/2009 | Van Horn et al. | ...... | 705/26 |
| 7,593,871 B1 * | 9/2009 | Mesaros | ...... | 705/26 |
| 7,937,294 B1 * | 5/2011 | Murray et al. | ...... | 705/26.2 |
| 2002/0165817 A1 * | 11/2002 | Rackson et al. | ...... | 705/37 |
| 2004/0260624 A1 * | 12/2004 | Chan et al. | ...... | 705/26 |
| 2005/0108193 A1 * | 5/2005 | Schauerte et al. | ...... | 707/1 |
| 2006/0206386 A1 * | 9/2006 | Walker et al. | ...... | 705/21 |
| 2007/0185784 A1 * | 8/2007 | Andersen | ...... | 705/27 |

OTHER PUBLICATIONS

Bid Together, Buy Together, Handbook of Electronic Commerce in Business and Society, CRC Press 2002.*
Office Action issued in U.S. Appl. No. 11/901,043 dated Mar. 5, 2009.
Office Action issued in U.S. Appl. No. 11/901,043 dated Sep. 30, 2009.
Office Action issued in U.S. Appl. No. 11/901,043, mailed Jul. 16, 2010, 29 pages.
Office Action for U.S. Appl. No. 11/901,043, mailed Feb. 1, 2011, 29 pages.

* cited by examiner

*Primary Examiner* — Yogesh C Garg
*Assistant Examiner* — Matthew Zimmerman
(74) *Attorney, Agent, or Firm* — Sprinkle IP Law Group

(57) ABSTRACT

Systems and methods for organizational purchasing are disclosed herein. More specifically, in certain embodiments a campaign corresponding to a product may be created and potential buyers informed of the campaign. These potential buyers may then themselves purchase the product in association with the campaign. In this manner not only are potential buyers informed that a product is being offered to one or more other buyers but the purchases of the individual buyers in association with the campaign may be aggregated to, for example, achieve a lower purchasing cost for each buyer relative to what the buyer would have paid if he had purchased only the quantity of product he desired.

24 Claims, 18 Drawing Sheets

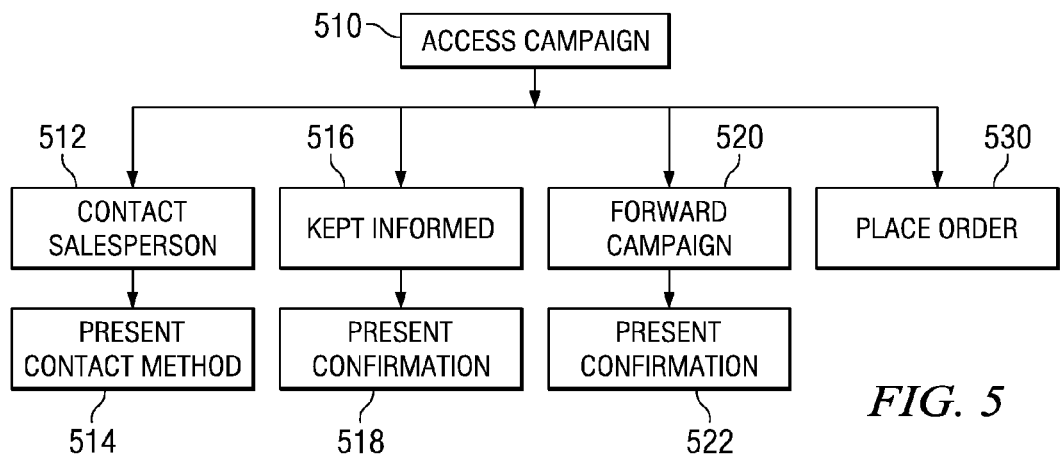
FIG. 5
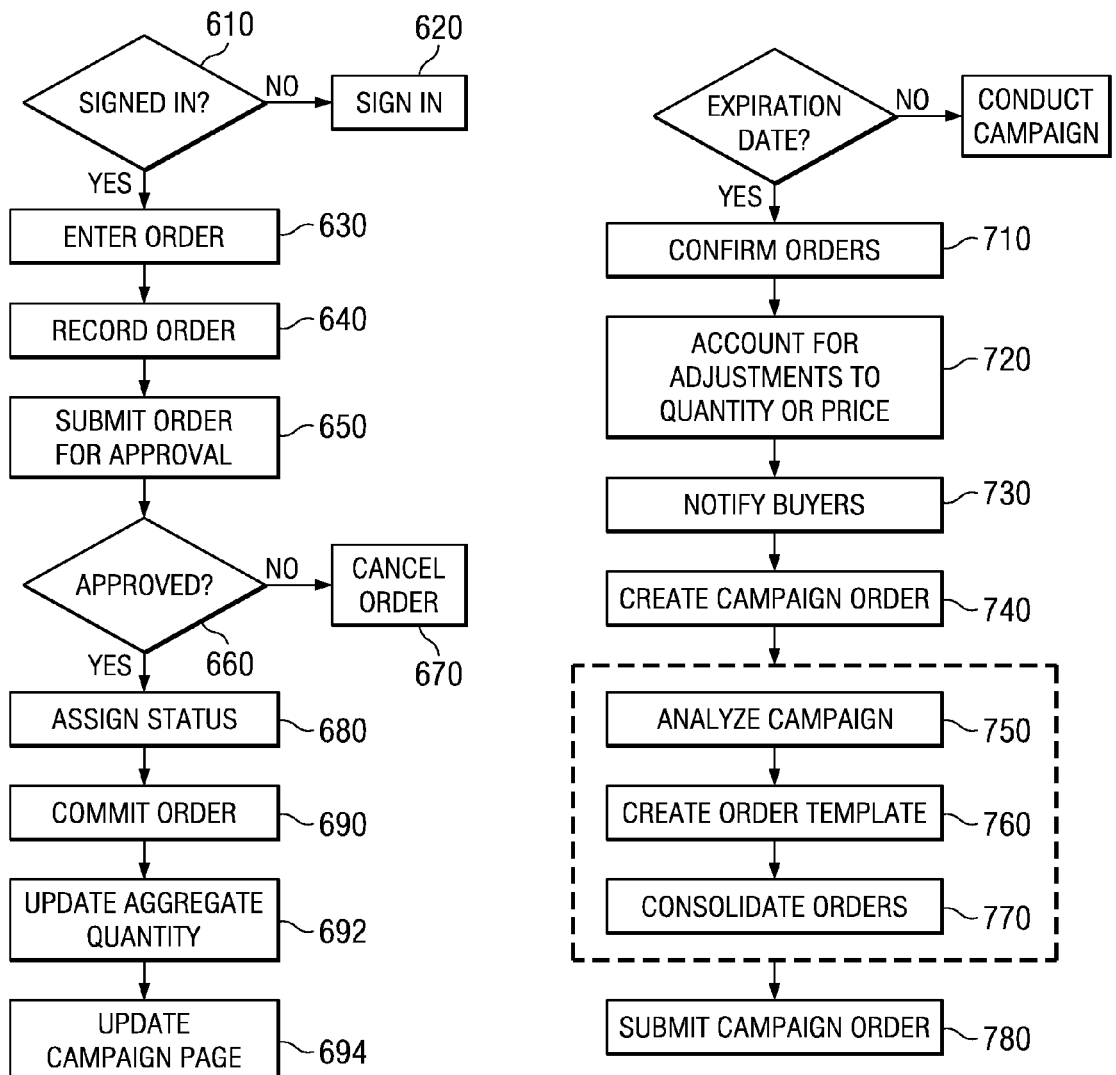
FIG. 6
FIG. 7

| Edit Campaign | | Logged in as: Jeremy Kraybill (administrator) |
|---|---|---| your logo here

| Upload a File | Administration | Help | Logout |

- My BrandForge Home
- My Campaigns
- My Orders
- My Profile
- My Launched Campaigns
- My Customers' Orders
- All Campaigns
- All Orders Campaign Information

Campaign

* Name: Demo Campaign-Buyer    In Hands Date: 07/31/2007
Description: _____    *Start Date: 01/05/2007
Target Company: Your Logo Here Demo ▼    *End Date: 06/30/2007
Sales Person: Joe Holland (admin) ▼    ☑ Enable "Forward to a Friend"
Creator: Mark Lopez (admin main) ▼

Message Body: Welcome to the Brandforge Demo Campaign. This email introduction can be customized to fit your exact needs. Products, pricing and all copy can also be adjusted for each campaigns' details.

Disclaimer: *Note: Prices and totals do not include shipping, handling, taxes and other fees or charges.

Sales Message:

Buying Instructions:

Payment Option
Payment Option: [Invoice All Buyers ▼]

Product
* Name: [Excursion Cargo Messenger Bag]
* Short Description: [Excursion Cargo Messenger Bag]
* Long Description: [This messenger bag is the ultimate travel bag for all travel needs. It includes an organizer under the flap for accessories, side pockets for cell phones or sunglasses, mesh wather bottle holder, and an adjustable shoulder strap.]

Specifications: [Product specs can go here.]

Large Image URL: [/resources/ngrimes@boundlessnetwork.com]
[Select]

Small Image URL: [/resources/ngrimes@boundlessnetwork.com]
[Select]

Page Layout: [image on left ▼]

* Box Quantity: [12]
Min. Order Qty: [ ]
Start Quantity: [ ]
Unit Text: [each]

FROM FIG. 8B-1

Product Buyer Options

[Add Buyer Option]

| | Min. Qty | Tier2 Qty | Tier3 Qty | Tier4 Qty | Tier5 Qty |
|---|---|---|---|---|---|
| | 36 | 144 | 576 | | |

1 – Buyer Option: Blank Bag [Remove]

* Description: Blank Bag
* Item Number: 3500-54   Item Color:
  Item Type:   Item Size:
  Logo Name:   Logo Placement:
  Imprint Text:   Imprint Color:

| | | | | |
|---|---|---|---|---|
| Net Price ($): 6.10 | 6.10 | 6.10 | | |
| Margin (%): 35.11 | 29.89 | 25.15 | | |
| Price ($): 9.40 | 8.70 | 8.15 | | |

Supplier: Leeds 66887 ▼

Art Instructions:

2 – Buyer Option: Bag with Embroidered Logo [Remove]

* Description: Bag with Embroidered Logo
* Item Number: 3500-54   Item Color:
  Item Type:   Item Size:
  Logo Name:   Logo Placement:
  Imprint Text:   Imprint Color:

| | | | | |
|---|---|---|---|---|
| Net Price ($): 6.10 | 6.10 | 6.10 | | |
| Margin (%): 47.86 | 43.78 | 39.90 | | |
| Price ($): 11.70 | 10.85 | 10.15 | | |

Supplier: Leeds 66887 ▼

Art Instructions: Logo embroidered on front, center.

Hidden/Non-Optional Order Items

[Add Required Per Items Ordered]   [Add Required Per Line item]   [Add Required Per Order]

[Save]   [Cancel]

*FIG. 9*

| User List | | Logged in as: Jeremy Kraybill |
|---|---|---|
| Customer Logo Here | | (administrator) |
| | Upload a File    Administration    Help    Logout | |

| | | |
|---|---|---|
| My BrandForge Home | Current Users | |
| My Campaigns | [Add new user] | |
| My Orders | 333 users found, displaying 1 to 50. | [First/Prev] 1, 2, 3, 4, 5, 6, 7 |
| My Profile | E-Mail                   Last Name   First Name   Enabled   Current Roles | |
| My Launched Campaigns | ageorge@boundlessnetwork.com   George   Amber         salesperson<br>ageorge@boundlessnetwork.com   George   Amber         salesperson<br>ageorge@boundlessnetwork.com   George   Amber         salesperson | |
| My Customers' Orders | ageorge@boundlessnetwork.com   George   Amber         salesperson<br>ageorge@boundlessnetwork.com   George   Amber         salesperson<br>ageorge@boundlessnetwork.com   George   Amber         salesperson | |
| All Campaigns | ageorge@boundlessnetwork.com   George   Amber         salesperson<br>ageorge@boundlessnetwork.com   George   Amber         salesperson | |
| All Orders | | |

*FIG. 10*

View Campaign (Buyer View)                Logged in as: Jeremy Kraybill (administrator)

HOLIDAY CONCIERGE
Upload a File    Administration    Help    Logout

- My BrandForge Home
- My Campaigns
- My Orders
- My Profile
- My Launched Campaigns
- My Customers' Orders
- All Campaigns
- All Orders Classic Leather Tumbler Cutter & Buck Classic Leather Tumbler
This ever-popular 16 oz. tumbler is great for holiday gift-giving, employee recognition, or client appreciation. It features a stainless steel lid with plastic thumb-side closure. Genuine mahogany leather wrap with your company logo debossed on the leather that's easy to remove and clean. Fit's all standard cup holders. Includes 1-piece Cutter & Buck gift box.

If you would like this item custom wrapped by Boundless Network with a fine white gift paper, red ribbon, and custom gift tag, please put a comment in the Notes/Special Instructions box when you place your order. Prices start at $9.95 per box and go down depending on volume.

Power-Buy Quantity ? : | 24-99 | 100-249 | 250-499 | 500-1999 | 2000+ |

Unit Price: | $14.83 | $14.45 | $13.90 | $13.25 | $12.75 |
* base item prices

Campaign Status
Power-Buy Quantity: 0
Expiration date: 10/15/07
Days Left: 70
In Hands Date: 12/7/07
*Note: Prices do not include shipping or tax.

| Quantity | Description | Price/each | Subtotal |
|---|---|---|---|
| 0 | Classic Mahogany Leather Tumbler | 14.83 | 0.00 |
| * min order size of 24 | | Total: | $0.00 |

[Contact Salesperson] [Keep me Informed] [Forward to a Friend] [Buy] [Cancel X]

FIG. 11A

| Contact Salesperson | | Logged in as: Jeremy Kraybill |
| --- | --- | --- |
| Customer Logo Here | | (administrator) |
| | Upload a File  Administration  Help  Logout | |

- My BrandForge Home
- My Campaigns
- My Orders
- My Profile
- My Launched Campaigns
- My Customers' Orders
- All Campaigns
- All Orders Contact Salesperson
  Salesperson Contact Information Sales Guy
  1 Sales Street                Phone: 512-879-4405
  Salestown, TX 78759           email: jkraybill1@boundlessnetwork.com Send Email To: Sales Guy <jkraybill1@boundlessnetwork.com>
    From: [ jkraybill1@boundlessnetwork.com ]
    Message: [                                ]

[ Send ]  [ Cancel ]

FIG. 11B

| Contact Salesperson Acknowledgement | | Logged in as: Jeremy Kraybill |
| --- | --- | --- |
| Customer Logo Here | | (administrator) |
| | Upload a File  Administration  Help  Logout | |

- My BrandForge Home
- My Campaigns
- My Orders
- My Profile
- My Launched Campaigns
- My Customers' Orders Order Information ⓘ Your message was successfully sent.

Order Information

Order Status: pending            Buyer: Jeremy Kraybill
  Order Date: 5/29/07            Address: 200 E. 6th Street Suite 300
In Hands Date: 5/11/07                    Austin           TX 78701
   Campaign: TEST v2 CAMPAIGN    email: jkraybill1@boundlessnetwork.com
 Status Log:                     phone: 512-879-4405
                                 Salesperson: Sales Guy

| Enter Order | | | Logged in as: Jeremy Kraybill |
| --- | --- | --- | --- |
| HOLIDAY CONCIERGE | | | (administrator) |
| | Upload a File | Administration | Help   Logout |

- My BrandForge Home
- My Campaigns
- My Orders
- My Profile
- My Launched Campaigns
- My Customers' Orders
- All Campaigns
- All Orders Order Information Your credit card will be charged within 90 days following the close of this campaign.

Order detail

| Item Number | Description | Quantity | Unit Price | Extended Price |
| --- | --- | --- | --- | --- |
| 9850-34 | Classic Mahogany Leather Tumbler | 25 | $14.83 | $370.75 |
| | | | Total | $370.75 |

*Note: Prices do not include shipping or tax.

Billing Information

* First Name: Jeremy
* Last Name: Kraybill
* Company:
* Address 1: 200 E. 6th Street Suite 30
  Address 2:
* City: Austin
* State: TX
* Zip: 78701
* Country: US
  Fax:
  Phone: 512-879-4405
  Client PO:

Shipping Information
Same as billing: ☐

* First Name: Jeremy
* Last Name: Kraybill
* Company:
* Address 1: 200 E. 6th Street Suite 30
  Address 2:
* City: Austin
* State: TX
* Zip: 78701
* Country: US
  Fax:
  Phone: 512-879-4405

*FIG. 14B*

```
Payment Option
                    Card Holder Name: [         ]
                    Credit Card Type: [MasterCard ▼]
                     Credit Card Num: [            ]
                           Exp Date: [August ▼] [2007 ▼]
                    (?) CVV Number: [    ]
Instructions/Notes
        Instructions: [                              ]
                     [                              ]
                     [                              ]

[ Save ]  [ Cancel ]

2007  Boundless Network  Privacy Policy
```

*FIG. 14C*

| Order Acknowledgement | | Logged in as: Jeremy Kraybill (administrator) |
|---|---|---|
| 🎁 *HOLIDAY CONCIERGE* | Upload a File   Administration   Help   Logout | |

| | |
|---|---|
| 🏠 My BrandForge Home | ⓘ Order has been added successfully. |
| ⟲ My Campaigns | My Active Campaigns — 9 Campaigns found, displaying 1 to 3    My Pending Orders — 2 orders found, displaying all orders. |
| 🛒 My Orders | [First/Prev] 1, 2, 3 [Next/Last] |
| 👤 My Profile | |
| ⟲ My Launched Campaigns | |
| 🛒 My Customers' Orders | |
| ⟲ All Campaigns | |
| 🛒 All Orders | |

Name    End Date        Name    Order Date
Holiday Concierge   9/15/07   No Image Available   Classic Leather Tumbler   8/6/07
1 GB USB Flash Drives   8/15/07   No Image Available   Test v2 CAMPAIGN   5/29/07
Women's Cutter & Buck Classic Polo   8/13/07    My Customers' Orders — No customer orders found.

My Launched Campaigns
No launched campaigns found.

Name   Buyer   Order Date   Total Qty   Total
Nothing found to display.

Name   End Date   Total Orders   Total Qty   Days Left
Nothing found to display.

2007 Boundless Network  Privacy Policy

*FIG. 15A*

My Campaigns
Customer Logo Here

Logged in as: Jeremy Kraybill (administrator)

Upload a File    Administration    Help    Logout

- My BrandForge Home
- My Campaigns
- My Orders
- My Profile
- My Launched Campaigns
- My Customers' Orders
- All Campaigns
- All Orders

My Campaigns
12 Campaigns found, displaying all campaigns.

| Name | Sales Person | Group Qty | Group Savings | Start Date | End Date | Days Left | State |
|---|---|---|---|---|---|---|---|
| TEST Veterans Women's Cutter & Buck Classic Polo | Sales Guy | 2 | $0.00 | 08-01-2007 | 08-13-2007 | 7 | open |
| Windshirts | Amber George | 10 | $0.00 | 08-01-2007 | 08-13-2007 | 7 | open |
| TEST Veterans Women's Hartwell Short Sleeve Pique Polo | Sales Guy | 10 | $0.00 | 08-01-2007 | 08-13-2007 | 7 | open |
| Windshirts | Amber George | 47 | $0.00 | 08-01-2007 | 08-13-2007 | 7 | open |
| Men's Tradeshow Apparel | Amber George | 26 | $0.00 | 07-05-2007 | 07-20-2007 | 0 | closed |
| Windshirts | Amber George | 110 | $0.00 | 07-05-2007 | 07-20-2007 | 0 | closed |
| TEST v2 CAMPAIGN | Sales Guy | 0 | $0.00 | 07-02-2007 | 07-11-2007 | 0 | closed |
| Windshirts | Amber George | 0 | $0.00 | 07-02-2007 | 07-11-2007 | 0 | closed |
| TEST Smarter Choice Gel Pen's | Sales Guy | 5800 | $320.00 | 07-01-2007 | 07-11-2007 | 0 | closed |
| Rising Star | Amber George | 112 | $0.00 | 06-20-2007 | 07-08-2007 | 0 | closed |
| TEST v2 CAMPAIGN | Sales Guy | 0 | $0.00 | 05-08-2007 | 09-16-2007 | 41 | open |
| Windshirts | Amber George | 57 | $570.00 | 10-31-2006 | 11-10-2006 | 0 | closed |

2007 Boundless Network   Privacy Policy

All Orders

Customer Logo Here

Logged in as: Jeremy Kraybill (administrator)

Upload a File    Administration    Help    Logout

- My BrandForge Home
- My Campaigns
- My Orders
- My Profile
- My Launched Campaigns
- My Customers' Orders
- All Campaigns
- All Orders

All Orders

Salesperson: [all ▼]    State: [active ▼]    [Go!]

402 items found, displaying 1 to 50.

[First/Prev] <u>1</u>, <u>2</u>, <u>3</u>, <u>4</u>, <u>5</u>, <u>6</u>, <u>7</u>, <u>8</u>, [Next/Last]

| Name | Order Date | Total Quantity | Total | Buyer | Company | Bill To Name | City | Sales Person | State | Send Email |
|---|---|---|---|---|---|---|---|---|---|---|
| TEST Veterans Classic Polo | 08-06-2007 | 4 | $100.50 | Dawn Boudreaux | Walnut Creek | Dawn Boudreaux | Garland | Dawn Boudreaux | pending | ☐ |
| Tailored Construction Polo Shirt | 08-05-2007 | 2 | $23.75 | Dawn Boudreaux | San Leandro | Dawn Boudreaux | San Antonio | Dawn Boudreaux | pending | ☐ |
| TEST Veterans Classic Polo | 08-04-2007 | 2 | $50.25 | Dawn Boudreaux | Walnut Creek | Dawn Boudreaux | Walnut Creek | Dawn Boudreaux | pending | ☐ |
| Tailored Construction Polo Shirt | 08-03-2007 | 1 | $23.50 | Dawn Boudreaux | San Leandro | Dawn Boudreaux | seguin | Dawn Boudreaux | pending | ☐ |
| TEST Veterans Classic Polo | 08-03-2007 | 1 | $46.00 | Dawn Boudreaux | Walnut Creek | Dawn Boudreaux | San Diego | Dawn Boudreaux | approved | ☐ |
| Tailored Construction Polo Shirt | 08-03-2007 | 2 | $27.75 | Dawn Boudreaux | San Leandro | Dawn Boudreaux | San Leandro | Dawn Boudreaux | approved | ☐ |
| TEST Veterans Classic Polo | 08-03-2007 | 2 | $27.75 | Dawn Boudreaux | Walnut Creek | Dawn Boudreaux | Livermore | Dawn Boudreaux | approved | ☐ |

*FIG. 15B*

All Campaigns

Customer Logo Here

Logged in as: Jeremy Kraybill (administrator)

Upload a File    Administration    Help    Logout

- My BrandForge Home
- My Campaigns
- My Orders
- My Profile
- My Launched Campaigns
- My Customers' Orders
- All Campaigns
- All Orders

All Campaigns

[Create a new campaign]

17 campaigns found, displaying all campaigns.

Salesperson: [all ▼]    State: [active ▼] [Go!]

| Name | Target Company | Total Orders | Quantity Ordered | Savings | Start Date | End Date | Days Left | Sales Person | Creator | State |
|---|---|---|---|---|---|---|---|---|---|---|
| TEST Veterans Classic Polo | Holiday Concierge | 0 | 0 | $0.00 | 08-06-2007 | 09-13-2007 | 40 | Kyle Sweeney | Kyle Sweeney | open |
| Backpacks | Your Logo Here Demo | 0 | 0 | $0.00 | 08-02-2007 | 08-09-2007 | 3 | Kyle Sweeney | Kyle Sweeney | open |
| 1 GB USB Flash Drives | Holiday Concierge | 0 | 0 | $0.00 | 08-06-2007 | 08-15-2007 | 9 | Kyle Sweeney | Kyle Sweeney | open |
| Backpacks | Your Logo Here Demo | 2 | 2 | $0.00 | 08-01-2007 | 08-13-2007 | 7 | Dawn Boudreaux | Kyle Sweeney | open |
| Cutter and Buck Classic Polo Shirt | Holiday Concierge | 8 | 10 | $0.00 | 08-01-2007 | 08-13-2007 | 7 | Dawn Boudreaux | Kyle Sweeney | open |
| Backpacks | Your Logo Here Demo | 3 | 10 | $0.00 | 08-01-2007 | 08-13-2007 | 7 | Dawn Boudreaux | Kyle Sweeney | open |
| Cutter and Buck Classic Polo Shirt | Holiday Concierge | 14 | 47 | $0.00 | 08-01-2007 | 08-13-2007 | 7 | Dawn Boudreaux | Kyle Sweeney | open |
| Classic Leather Tumbler | Holiday Concierge | 0 | 0 | $0.00 | 07-30-2007 | 08-24-2007 | 18 | Kyle Sweeney | Kyle Sweeney | open |
| Classic Red Metal Slinky | Holiday Concierge | 0 | 0 | $0.00 | 07-25-2007 | 08-10-2007 | 4 | Kyle Sweeney | Kyle Sweeney | open |
| Holiday Concierge Multi-Product Demo | Your Logo Here Demo | 0 | 0 | $0.00 | 07-23-2007 | 08-21-2007 | 15 | Kyle Sweeney | Kyle Sweeney | open |
| Holiday Concierge Demo | Holiday Concierge | 0 | 0 | $0.00 | 07-23-2007 | 08-21-2007 | 15 | Kyle Sweeney | Kyle Sweeney | open |
| Remove before Flight | Your Logo Here Demo | 19 | 371 | $0.00 | 07-17-2007 | 08-05-2007 | 1 | Vanessa Sweeney | Kyle Sweeney | open |

View Order

Customer Logo Here

Logged in as: Jeremy Kraybill (administrator)

Upload a File    Administration    Help    Logout

- My BrandForge Home
- My Campaigns
- My Orders
- My Profile
- My Launched Campaigns
- My Customers' Orders
- All Campaigns
- All Orders

Order Information

Order Information

Order Status: pending
Order Date: 5/29/07
In Hands Date: 5/11/07
Campaign: TEST v2 CAMPAIGN
Status Log:

Buyer: Jeremy Kraybill
Address: 200 E. 6th Street Suite 300
         Austin    TX 78701
email: jkraybill1@boundlessnetwork.com
phone: 512-879-4405
Salesperson: Sales Guy

Order Detail

| Item Number | Description | Supplier | Net Price | Quantity | Unit Price | Extended Price |
|---|---|---|---|---|---|---|
| ITEM NUMBER | OPTION 1 | Alpha Shirt Company | $12.00 | 24 | $20.00 | $480.00 |
| REQ1 | REQUIRED PER ITEM | Unlimited Custom Embroidery | $0.10 | 24 | $0.20 | $4.80 |
| LINUM | REQ PER LI | Sanmar | $0.50 | 1 | $1.00 | $1.00 |
| NUM2 | OPTION 1 WITH SKITTLES | H&C Headware/Capco Sprtswear | $13.00 | 24 | $22.00 | $528.00 |
| REQ1 | REQUIRED PER ITEM | Unlimited Custom Embroidery | $0.10 | 24 | $0.20 | $4.80 |
| LINUM | REQ PER LI | Sanmar | $0.50 | 1 | $1.00 | $1.00 |
| RPONUM | REQ PER ORDER | Alpha Shirt Company | $5.00 | 1 | $10.00 | $10.00 |
|  |  |  |  |  | Total | $1,029.60 |

TO FIG. 15D-2

FROM FIG. 15D-1

Your Total Quantity: 48　　　Group Total Quantity: 0
Your Savings: $192.00　　　Group Savings: $0.00

*Note: Prices do not include shipping or tax. **Second Note: this is a disclaimer, for testing purposes.

Bill To:　　　　　　　　　　　　　　Ship To:

Buyerbt Guybt　　　　　　　　　　　Buyerst Guyst
IBM Corporationbt　　　　　　　　　IBM Corporationst 1 Buy Streetbt　　　　　　　　　　　1 Buy Streetst
addr12bt　　　　　　　　　　　　　　addr2st
Buytownbt TXbt 78755　　　　　　　Buytownst TXst 78766
USbt　　　　　　　　　　　　　　　　USst Phone: 512-879-4405bt　　　　　　Phone: 512-879-4405st
Fax: 512-879-4405bt　　　　　　　Fax: 512-879-4405st Client PO: PObt Payment Option

* The specified billing address will be invoiced for this purchase.

Instructions/Notes

My Instructions for you.

Contact Salesperson ▷　　View Campaign　　Done

*FIG. 15D-2*

METHOD AND SYSTEM FOR TIERED PRICING OF CUSTOMIZED BASE PRODUCTS

RELATED APPLICATIONS

This application claims a benefit of priority to the filing date of U.S. Provisional Patent Application Ser. No. 60/844,566 by inventors Jason Black and Henrik Johansson, entitled "System and Method for Network-Based Buyer Purchasing and Communication" filed on Sep. 14, 2006, the entire contents of which are hereby expressly incorporated by reference for all purposes.

TECHNICAL FIELD

This invention relates generally to the field of purchasing of goods, and specifically to the purchasing of products by a number of buyers of such goods across multiple organizations and a network-based system for enabling and aggregating purchases and communications about such purchases.

BACKGROUND

In recent times the purchasing of promotional products by companies or other organizations has grown by leaps and bounds. In fact, it is now the case that divisions within an organization and certain locations of an organization may purchase their own specific promotional products. Because of the ad-hoc and dispersed nature of these purchases, the purchasing of promotional products is typically not controlled or managed inside an organization, nor is the purchasing accounted for in any consistent manner.

Typically, promotional products are purchased by individuals in specific locations or departments inside an organization rather than by any sort of centralized procurement or purchasing department. In many cases, however, many buyers inside the same organization are looking for the same or similar types of products during the same time period, completely unaware of other individuals' efforts or desires to obtain these products as well. Additionally, as the purchasing of promotional product may not be centralized there may not be a uniform application of corporate or organizational guidelines regarding the purchases of promotional products such as rules regarding the use of organizational brands, trademarks or the like.

As a result there may be many individuals within an organization spending time, effort, or money trying to obtain similar types of products, without communicating with each other and without applying the appropriate organizational brand guidelines. This distributed purchasing of similar promotional products may mean that the combined purchasing power of all the buyers may not be leveraged and that organizational guidelines may not be uniformly applied with respect to the purchasing of promotional products (similar or otherwise). Furthermore, in some cases an organization may be so small that no matter how many people within an organization desire to purchase a product it may be difficult if not impossible to achieve volume based discounts based only upon purchases made by buyers within that organization.

Some companies try to coordinate and manage their buying through "corporate web-stores" for promotional products. These online stores may allow buyers to purchase promotional products that have been approved by corporate and that meet corporate guidelines. However, the static nature of such stores does not meet the constantly changing demands of purchasers of promotional products. As a result, buyers of promotional products are loathe to utilize such corporate web-stores and may look elsewhere for their promotional products. Thus, such stores typically only receive a small percentage of the total corporate purchase volume. Moreover, even if such stores are utilized by buyers within an organization a sufficient volume of product to achieve any sort of economies of scale may not be achieved by buyers within the organization.

SUMMARY

Systems and methods for organizational purchasing are disclosed herein. More specifically, in certain embodiments a campaign corresponding to a product may be created and potential buyers informed of the campaign. These potential buyers may then themselves purchase the product in association with the campaign. In this manner not only are potential buyers informed that a product is being offered to one or more other buyers but the purchases of the individual buyers in association with the campaign may be aggregated to, for example, achieve a lower purchasing cost for each buyer relative to what the buyer would have paid if he had purchased only the quantity of product he desired.

More particularly, in one embodiment, a parent campaign may be created, where the parent campaign may have a default expiration date and an associated default tiered pricing matrix comprised of one or more ranges of product quantities and a corresponding price for each of the ranges. One or more organization specific campaigns may also be created and associated with the parent campaign, where the organizations specific campaign may have its own organization specific expiration data or organization specific pricing matrix. An initial set of potential buyers in multiple organizations may then be directly informed of the campaign through a communication over a communication network, while other potential buyers may be informed of the campaign indirectly over the communication network through the initial set of potential buyers. Up until the expiration date of the parent campaign, or an organization specific expiration data associated with an organization of a potential buyer, any of these potential buyers may utilize the communication network to make a purchase of some quantity of the product in association with the campaign. After the campaign expiration date, then, all of the purchases made in association with the campaign (e.g. the quantity purchased by each of the buyers) may be aggregated such that the price paid by buyers for the product may reflect the aggregate quantity purchased by all buyers, all the buyers within a particular organization or some combination.

By informing potential buyers of the campaign both directly and indirectly through a communication network and allowing potential buyers to make purchases in association with the campaign through a location on or in a communication network (e.g. through a website, etc.) a virally based communication and aggregation of product purchases may be accomplished, simultaneously obtaining volume based discounts for the buyers of such products while alleviating the need to manually coordinate, manage or regulate such processes. Additionally, by coordinating these purchases through a central location organizational rules may be better adhered to and brands, trademarks, logos, artwork, etc. associated with the company may be better controlled.

In particular, embodiments of such a network based purchasing system may allow promotional products to be more effectively purchased by members of multiple organizations. Buyers in multiple organizations may more easily "piggyback" on existing buyers' orders even if those buyers are affiliated with other organizations. This ability reduces effort, and increases purchasing power, with a lower price for all buyers as a result. When a buyer places an order for a promotional product, they can make it available to other buyers and invite new buyers to access the network based purchasing system. Not only may buyers get a better price for the products they are purchasing but buyers may also spend less time searching for products. Organizations may save money as they leverage their collective purchasing power in conjunction with the purchasing power of other buyers outside the organization.

Embodiments of the invention disclosed herein can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein. Programming techniques, computer languages, devices, and computer-readable media necessary to accomplish this are known in the art and thus will not be further described herein.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

FIG. 5 is a flow diagram for a methodology of interacting with an interface for a campaign;

FIG. 6 is a flow diagram for a methodology of processing an order in conjunction with a campaign;

FIG. 7 is a flow diagram for a methodology for determining or placing a campaign order;

FIGS. 8A and 8B are examples of interfaces for use with embodiments of systems and method for network based purchasing;

FIG. 9 is an example of an interface for use with embodiments of systems and method for network based purchasing;

FIG. 10 is an example of an interface for use with embodiments of systems and method for network based purchasing;

FIGS. 11A and 11B are examples of interfaces for use with embodiments of systems and method for network based purchasing;

FIG. 12 is an example of an interface for use with embodiments of systems and method for network based purchasing;

FIGS. 14A, 14B and 14C are examples of interfaces for use with embodiments of systems and method for network based purchasing; and FIGS. 15A, 15B, 15C and 15D are examples of interfaces for use with embodiments of systems and method for network based purchasing.

DETAILED DESCRIPTION

Figure 1:
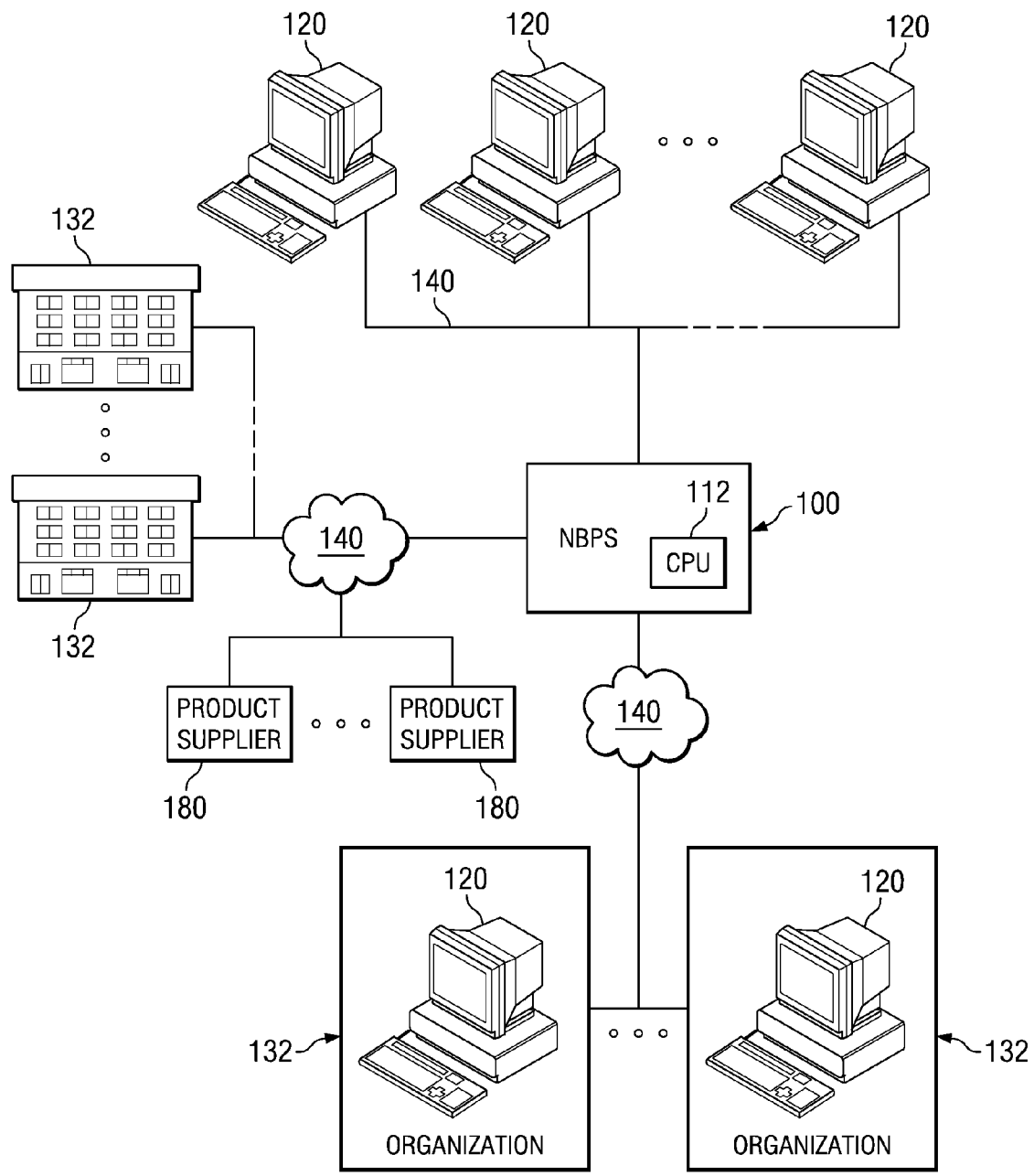
FIG. 1 is a block diagram of a system comprising a network based purchasing system.

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above in many cases individuals within various organizations spend time, effort, or money trying to obtain similar types of products, without communicating with each other and without applying the appropriate organizational brand guidelines within an organization. This distributed purchasing of similar products may mean that the combined purchasing power of buyers within multiple organizations may not be leveraged and that organizational guidelines may not be uniformly applied with respect to the purchasing of these products within a particular organization. What is desired then is to allow potential buyers across multiple organizations to effectively communicate regarding products being purchased such that any of those potential buyers who desire to purchase the product may aggregate their purchases with those of other buyers, including buyers within disparate organizations.

To that end, attention is now directed to systems and methods for network based organizational purchasing. In one embodiment, a campaign corresponding to a product may be created and potential buyers informed of the campaign. These potential buyers may then themselves purchase the product in association with the campaign. In this manner not only are potential buyers informed that a product is being offered to one or more other buyers but the purchases of the individual buyers in association with the campaign may be aggregated to, for example, achieve a lower purchasing cost for each buyer relative to what the buyer would have paid if he had purchased only the quantity of product he desired.

More specifically, in one embodiment, a parent campaign may be created based upon a buyer's desire to purchase a particular product or a salesman's desire to offer the opportunity to buy the particular product to multiple potential buyers. This parent campaign may have a campaign expiration date and an associated default tiered pricing matrix comprised of one or more ranges of product quantities and a corresponding price for each of the ranges, where the corresponding price may be inversely related to the quantities associated with the product range (e.g. the higher the quantities associated with the product range the lower the corresponding price).

One or more organization specific campaigns may also be created in association with the parent campaign, where each of the organizational specific campaigns may correspond to a particular organization and have an associated organization specific expiration date or organization specific tiered pricing matrix. Buyers within multiple organizations may then be informed of the parent campaign. Up until any organization specific expiration date associated with that buyer's organization or the campaign expiration date any of these potential buyers may make a purchase of some quantity of the product in association with the parent campaign. After the campaign expiration date, then, at least a portion of the purchases made in association with the parent campaign may be aggregated (e.g. portions of the quantity purchased by each of the buyers across the multiple organizations) such that the price paid by each of the buyers for the product reflects at least a portion of the quantity purchased by all buyers. In particular, in one embodiment, the price paid by any one of the buyers within an organization may be the price associated with the range of product quantities in a pricing matrix associated with that organization into which the aggregate quantity purchased by all buyers across all organizations falls.

By informing potential buyers of the campaign (i.e. the parent campaign or an associated organization specific campaign) both directly and indirectly and providing a centralized location, such as a website, where these potential buyers can make purchases in association with the campaign a virally based communication and aggregation of product purchases may be accomplished, simultaneously leveraging the purchasing power of buyers across multiple organizations to obtain volume based discounts for the buyers of such products while alleviating the need to manually coordinate, manage or regulate such processes.

Turning now to FIG. 1, a block diagram of one embodiment of just such a purchasing system is depicted. Network based purchasing system (NBPS) 100 may be utilized to create, process, store, update, communicate or otherwise manage data associated with the forming, conducting or management of one or more parent campaigns in conjunction with interactions with one or more administrators, salespersons, potential buyers or other persons with access to NBPS 100.

More particularly, one or more administrators, salespersons, or potential buyers affiliated with an organization 132 (e.g. company, non-profit origination, or any other grouping or association of people or entities) may be located remotely from NBPS 100 and may communicate with NBPS 100 via one or more communication methodologies such as via an electronic communication network (e.g. the Internet, one or more intranets or extranets, etc.), telephone, a postal service, etc. In one embodiment, administrators, salesperson and potential buyers may utilize computing devices 120 coupled to NBPS 100 via one or more electronic communication networks 140, one of which may be the Internet or an intranet, etc. Additionally, NBPS 100 may communicate with one or more product suppliers 180 who provide products which may be sold by operators of NBPS 100 (e.g. may be coupled via an electronic communication network to one or more computing devices at product suppliers 180).

Salespeople and administrators may be affiliated with operators of NBPS 100 and may communicate with NBPS 100 to create a parent campaign for one or more potential buyers at organization 132 where the parent campaign relates to an offer to purchase a product which may be supplied by a product supplier 180. Data corresponding to the created parent campaign is stored in association with NBPS 100. A communication regarding this parent campaign may be formed, and an initial set of potential buyers at organization 132 determined, using NBPS 100.

The communication may then be sent (e.g. from NBPS 100) to the initial set of potential buyers at organization 132. These potential buyers may then communicate with the NBPS 100 to purchase the product in association with the parent campaign, forward the parent campaign on to another potential buyer, contact a salesperson, obtain information about the parent campaign, etc. NBPS 100 may collect and store orders or other data associated with the parent campaign and at the end of the parent campaign aggregate the individual purchases of each of the buyers to form a campaign order which is placed with the product supplier 180 which supplies the product associated with the parent campaign.

NBPS 100 may utilize one or more computers or computer systems utilizing one or more processors 112 which execute a set of computer readable instructions on a computer readable media, where the computer readable instructions are translatable for performing at least some of the functionality of NBPS 100. Functionality associated with NBPS 100 may also be accomplished by salespeople, administrators or buyers or others.

Figure 2:
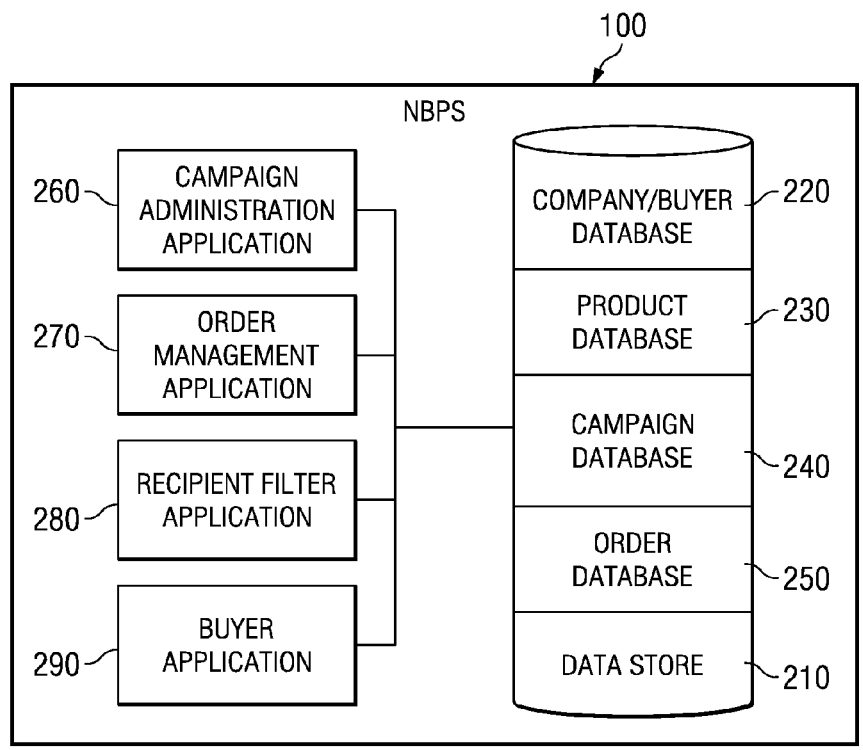
FIG. 2 is a block diagram of network based purchasing system.

Moving now to FIG. 2, a block diagram illustrating one particular embodiment of a NBPS 100 is depicted. For the sake of clarity the computer systems 120 utilized by salespeople, administrators and potential buyers at organization 132 and product suppliers 180 are not shown, but should be assumed to be in communication with NBPS 100 as previously described. Here, NBPS 100 comprises a data store 210, where the data store includes a company/buyer database 220, product database 230, a campaign database 240 and an order database 250.

In one embodiment, company/buyer database 220 comprises data regarding organizations 132 and buyers 130 associated with organizations. This data may be organized as profiles according to, or accessible by, customer relationship management (CRM) software such as that provided by Salesforce.com™ or the like. Company profiles may include such information as brand or trademark regulations or rules to be applied with respect to a company's trademarks, logos, slogans, etc. and may also include such information as upcoming events or other information specific to the company.

Buyer profiles may, for example, provide detailed information about a particular buyer's responsibilities or position within an organization 132 such as a department affiliation (marketing, human resources, procurement, sales, etc.); the buyer's buying habits, such as previously purchased products or product categories; the buyer's needs with respect to previous purchases, events, trade shows, awards, gifts, etc.; a use or function associated with previous purchases made by the buyer (e.g. is the item a desk item, associated with golf, for use in the home, clothing, etc.); etc. This buyer profile information may include, or be stored in conjunction with, keywords to help classify buyers and enable a keyword search with respect to buyer profiles.

Product database 230 holds information about products which may be sold by operators of NBPS 100 (e.g. which may be offered for sale by salespeople or provided by product suppliers 180). Data associated with each of the products may be stored, including such data such as stock numbers, product codes, product images, sizing information, colors, etc. In fact, almost any data desired about a product may be stored in product database 230.

Certain attributes of a product may, however, be helpful in determining which product to utilize in conjunction with a particular parent campaign (e.g. which product best matches a particular company or buyer profile). Data associated with one or more attributes of a product may therefore be associated with (e.g. stored in conjunction with) the product, where this data may vary from product to product. This attribute data may include keywords to help classify items and enable keyword search, such as "Luxury", "Female", "Metal" etc.; colors options for the product like "Green", "Black", "Blue", "Burgundy", "Metallic", "Gold", etc.; themes to simplify theme searches, such as "Western", "Office", "School", "Shopping", "Beach", etc.; applications or uses to help match to a particular need of a buyer or organization like "Trade Show", "Award", "Executive Gifts", etc. Again it will be noted that almost any data regarding a product or which may be useful in performing any operations associated with that product may be stored and associated with a product in product database 230.

Campaign database 240 stores data related to campaigns which may include a set of attributes, an associated status for a parent or organization specific campaign, web pages related to the parent campaign, organization specific campaign data associated with a parent campaign, web pages related to these organization specific campaigns, etc. In one particular embodiment, the attributes of a parent campaign may comprise one or more products and a set of associated information, where the associated information includes an expiration date for the parent campaign, a set of potential buyers, a default tiered pricing matrix and a current aggregate purchase quantity. Similarly, the attributes of a parent campaign may include data related to organization specific campaigns associated with the parent campaign such as an organization specific expiration date for an organization specific campaign, a set of potential buyers associated with the organization and corresponding to the organization specific campaign, a tiered pricing matrix corresponding to the organization specific campaign, etc.

Campaign database 240 may also store various statuses for each of the potential buyers associated with a parent campaign, including a status associated with one or more potential buyers for example, statuses may include: "Received" (for example when a potential buyer has received an email regarding the parent campaign), "Reviewed" (for example where a buyer has clicked a link in the email to view a page or website corresponding to the parent campaign); "Ordered" (for example a buyer has placed an order in association with the parent campaign). Other statuses may similarly be utilized. It will be apparent that one or more potential buyers may be associated with multiple parent campaigns in campaign database 240. In cases such as these a different status may be associated with the potential buyer with respect to each of the different parent campaigns if desired.

In the same manner, actions may be recorded in campaign databases for potential buyers associated with a parent campaign. These actions may include "Forwarded" (for example a potential buyer has forwarded the parent campaign to another potential buyer); "Invited" (for example a potential buyer has responded to a forwarded; "Registered" (for example a potential buyer has newly registered).

Order database 250 comprises data regarding orders. An order is a purchase by a buyer of a specific quantity of a product made in association with a parent campaign. The data stored in database 250 corresponding to an order may include a reference to the parent or organization specific campaign to which the order corresponds, along with data helpful in fulfilling the order (e.g. facilitating the ordered product being shipped to the buyer), such as a buyer name, buyer email address, a "Ship To" address (e.g. where to ship the ordered product), a "Bill To" address (e.g. where to send the invoice for the product), quantities of the product sorted by attribute (e.g. a certain amount of a certain color, a certain size, type, etc.). In general, order database 250 may comprise any information associated with an order which may be helpful in tracking, completing, approving, billing or otherwise processing an order.

After reading the above description of the various databases in data store 210 of NBPS 100 and the data stored therein it should be noted that more or fewer databases may be present in data store 210, that different, additional or lesser information may be stored and that the databases depicted are exemplary only. All of the information desired in a particular embodiment may be contained in one or multiple data bases or data stores according to the configuration of a particular embodiment.

No matter the configuration utilized, however, NBPS 100 may comprise one or more applications (e.g. computer executable instructions on a computer readable medium) which may utilize a least a portion of the data contained in data store 210 to create, manage, conduct or otherwise perform desired operations in conjunction with the data stored therein. These applications may be utilized in conjunction with, or present, a set of interfaces through which a user of the application may perform one or more operations associated with the application. These interfaces may, for example, include a graphical user interface (GUI), a command line interface, or one or more web pages which may be accessed through a web browser. These web pages may for example be in HTML or XHTML format, and may provide navigation to other web pages via hypertext links. These web pages may be retrieved by a user (e.g. using Hypertext Transfer Protocol or HTTP) from a local computer or from a remote web server where the server may restrict access only to a private network (e.g. a corporate intranet) or it may publish pages on the World Wide Web.

In one embodiment, these applications may include campaign administration application 260, order management application 270, recipient filter application 280 and buyer application 290. While the various functionality of each of these applications will be explained in more detail below it should be noted that the functionality described with respect to each of the applications is exemplary only and more or less functionality may be implemented in conjunction with certain embodiments of the invention. Furthermore, this functionality need not be separated into multiple applications and any desired functionality may be incorporated into a single application or multiple applications according to the embodiment desired.

In one embodiment, then, campaign administration application 260 may provide functionality and associated interfaces to allow a user to create a parent or associated organization specific campaign or view data associated with ongoing parent or organization specific campaigns. The creation of the parent or organization specific campaign may involve, and thus interfaces and functionality may be provided, for searching for and selecting appropriate products (e.g. using products database 240) based on one or more product attributes (as described above) and to select one or more products for a campaign. Once a product has been selected, the user may use campaign administration application 260 to provide additional information specific to the parent or organization specific campaign (as will be described in more detail below) including product pricing, an explanation of the parent or organization specific campaign, artwork information (for example logo to be place on a product, size, location and color of the artwork, etc.), an expiration date for the parent or organization specific campaign, etc.

Campaign administration application 260 may also allow a user to identify a set of potential buyers for a parent or organization specific campaign (e.g. using company/buyer database 230), send a communication to potential buyers and track the status of their actions in regards to that communication. Once a parent or organization specific campaign reaches its expiration date, the user may use campaign administration application 260 to review and close the parent campaign to send all the approved orders to an order processing system.

Recipient filter application 280 may provide functionality and interfaces which allow a user to identify potential buyers within an organization 132 (e.g. using profiles in company/buyer database 220) that may be interested in a product associated with a parent campaign and associate these potential buyers with a parent or organization specific campaign. More particularly, in one embodiment recipient filter application 280 may allow a user to filter or sort potential buyers based on a set of criteria, where this criteria may include keywords corresponding to the product associated with the parent campaign (e.g. which may be provided or generated by campaign administration application 260 in response to a product selection).

Order management application 270 may provide functionality and interfaces which allow a user to manage orders both on an individual and campaign level. This functionality may include receiving orders placed by a buyer and placing the order in a pending status. Order management application 280 provided interfaces through which a user may review a pending order to approve, verify, cancel or accept such an order. Order management application 280 may also provide functionality and interfaces to aggregately manage orders associated with a parent or organization specific campaign, for example to associate the correct information with each order of a parent or organization specific campaign. This information may include, for example, the current price for a product associated with the parent or organization specific campaign based upon a current aggregate quantity purchased (e.g. the quantity of products associated with all currently approved orders).

Buyer application 290 may provide interfaces and functionality which allow a buyer to register (e.g. create a user name and password) and to review parent or organization specific campaigns. These parent or organization specific campaigns may be campaigns for which he received a communication (e.g. is a potential buyer) or other currently open campaigns within his company. Buyer application 290 may allow a buyer to review certain attributes of a parent or organization specific campaign including the pricing matrix associated with the parent or organization specific campaign, the current aggregated purchase quantity and the corresponding price. Buyer application 290 may provide interfaces and functionality such that a buyer can place an order in conjunction with any of these campaigns or forward a campaign (e.g. a communication regarding any of the parent or organization specific campaigns) to other buyers. Buyer application 290 may also provide certain analytic tools such that a buyer may determine pricing impact based upon purchase quantities when the selected volume reaches different pricing tiers.

It should be noted here that the functionality offered to a particular user with respect to any of the applications 260, 270, 280, 290 discussed above may vary with access privileges accorded to a user based upon the user's status. For example, a buyer may be able to utilize interfaces which provide him the ability to view his profile, interfaces associated with campaigns which he has been invited to join or which are currently active within his company, any orders he has placed, etc. By the same token, a salesperson affiliated with the operators of NBPS 100 may be provided with interfaces which allow a salesperson to view all the campaigns (e.g. parent or organization specific) he initiated or any orders involved with all of those campaigns. Administrators may, however, be allowed to access interfaces which provide the ability to access all campaigns, all orders, all suppliers, all company and buyer profiles, a list of users of NBPS 100, etc.

Figure 3:
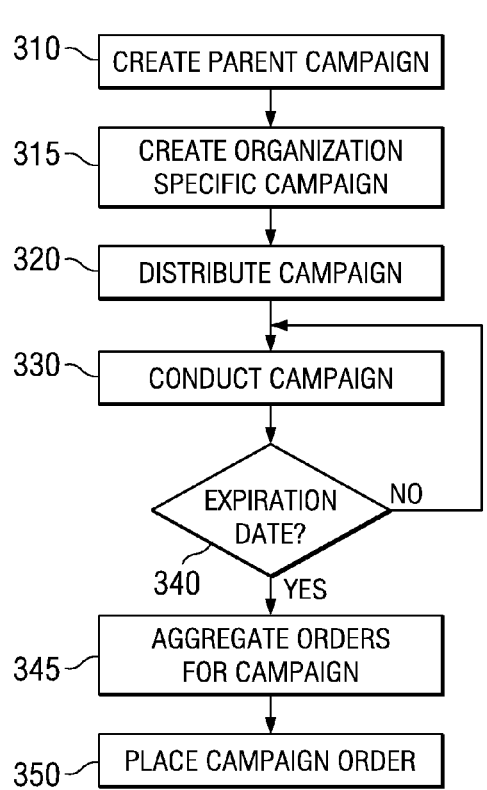
FIG. 3 is a flow diagram for a methodology for conducting a campaign.

As discussed above, the various databases 220, 230, 240, 250 and applications 260, 270, 280, 290 of NBPS 100 may be utilized to create, process, store, update or otherwise manage data associated with the forming, conducting or management of one or more parent or organization specific campaigns. It may be helpful here to discuss an implementation of a parent campaign in more detail. Referring now to FIG. 3, a flow diagram for one embodiment of a methodology for the implementation of a parent campaign is depicted. At the instigation of a person (e.g. a marketing director, project team manager, etc.) within a company, initiated unilaterally by a salesperson (e.g. affiliated with an operator of NBPS) or for some other reason, a parent campaign may be created at step 310, where the parent campaign is associated with one or more products, a default tiered pricing matrix and a campaign expiration date (e.g. a date on which the parent campaign will be closed or a time period for which the parent campaign will be open).

One or more organization specific campaigns associated with the parent campaign may then be created at step 315. More specifically, for a variety of reasons it may be desirable to provide different campaign attributes (e.g. other than the default attributes associated with the parent campaign with which the organization specific campaign is associated) in conjunction with the offering of a parent campaign to buyers within a particular organization. Thus, one or more organization specific campaign may be created in association with the parent campaign. This organization specific campaign may be associated with a particular organization and comprise a set of attributes to be utilized in conjunction with conducting the parent campaign with respect to that organization. Such attributes may include an organization specific expiration date (e.g. earlier than the campaign expiration date), an organization specific tiered pricing matrix (e.g. different than the default pricing matrix), etc.

It should be noted that it may be desirable to include or associate buyers with a particular parent campaign at a variety of points while the parent campaign is being conducted. Thus, the creation of organization specific campaigns may occur at any point while a parent campaign is being conducted (e.g. before the occurrence of the campaign expiration date) and need not be created when the campaign is initiated.

The created parent campaign may be distributed at step 320 by, in one embodiment, distributing a communication (phone, fax, email, etc.) to potential buyers with information corresponding to the parent campaign or an organization specific campaign associated with the parent campaign. During the time between the creation of the parent campaign and the occurrence of the campaign expiration date (as determined at step 340) the parent campaign may be conducted at step 330. The conducting of the parent campaign may include accepting, tracking or otherwise processing or communicating about orders, pricing or other information associated with the parent campaign and registering, authenticating or interacting with buyers to provide buyers with information about this (or other) campaigns or the ability to place orders and communicate (or obtain communications) about the campaign, etc.

After the occurrence of the expiration date at step 340, all the orders corresponding to the parent campaign may be aggregated at step 350. This aggregation process may include the combination of the quantities of the product ordered in each of the orders received (or verified) in association with the campaign. Using this aggregated purchase quantity then, a campaign order corresponding to the individual orders of the buyers may be placed to a supplier of the product associated with the campaign at step 360.

Figure 4:
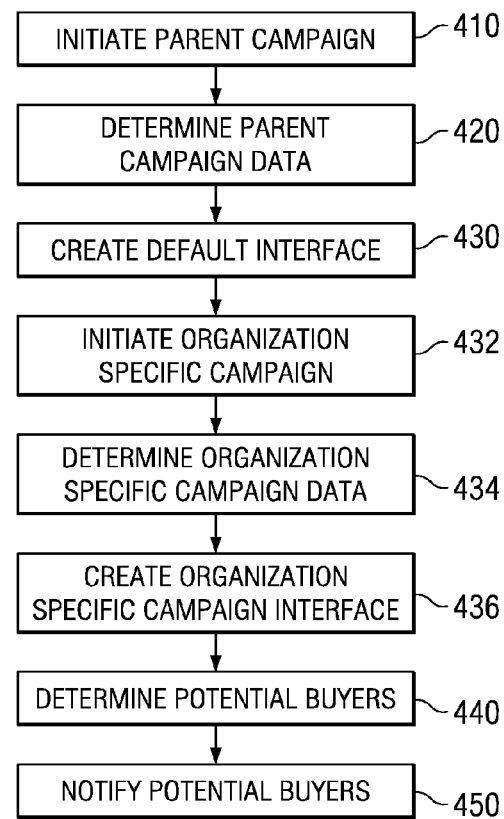
FIG. 4 is a flow diagram for a methodology for creating and distributing a campaign.

In order to better understand embodiments of the present invention these steps will now be illustrated in more detail. Turning first to FIG. 4, a flow diagram of one embodiment of a method for the creation of a parent campaign is depicted. At step 410 the parent campaign may be initiated. A parent campaign may be initiated for a variety of reasons. For example, a marketing director or another person at an organization 132 may wish to obtain a promotional product in conjunction with an event or a project with an organization, to offer to vendors or for a wide variety of other reasons. To this end they may contact a salesperson affiliated with NBPS 100. Alternatively, a salesperson affiliated with NBPS 100 may initiate a parent campaign of their own volition, for example, based upon an analysis of the organization's 132 previous purchase history, event schedule or other information associated with the organization, to offer a new product or a product on which there is currently a sale, etc.

After the parent campaign is initiated data relating to the parent campaign may be determined at step 420. This data may be obtained by a salesperson or administrator through a consultation with one or more people at organization 132, provided by one or more people at organization 132, determined from an analysis of data related to organization 132 or buyers within organization 132 (e.g. in company/buyer database 220), determined by an analysis of attributes of a product related to the initiated parent campaign (e.g. in product database 230), determined unilaterally by someone affiliated with organization 132 or a salesperson or administrator affiliated with NBPS 100, or by another means altogether. Once this data is determined it may be, for example, associated with the initiated parent campaign in campaign database 240. This data for the parent campaign may server multiple purposes. More particularly, the parent campaign data may be used in the creation for the creation of a parent campaign which may be generally used or distributed in conjunction with multiple buyers or organizations while additionally serving as a baseline or default values for the creation of organization specific campaign, speeding the creation of organization specific campaigns associated with the parent campaign.

This parent campaign data may include a campaign expiration date for the parent campaign and the product to be offered in conjunction with the parent campaign. As discussed, the product may be a product specifically requested by someone at organization 132 or which salesperson wishes to offer to potential buyers at organization 132 for any of a variety of reasons. The campaign expiration date may also be chosen for a variety of reasons, such as the day an event is to occur, a project is to complete, a sale of the product from supplier 180 to operators of NBPS 100 is to end, etc.

Once the product and expiration date are determined, attributes related to the product may also be included in the parent campaign data. These attributes may include things such as the size, color, configuration, etc. which may be chosen with respect to the product (e.g. the same shirt may come in red or blue, Large or Small sizes, etc.). These attributes may also include images of the product or other data which may be associated with the product (e.g. in product database 230).

A default pricing matrix for the parent campaign may also be included in the parent campaign data. This default pricing matrix may be ranges of product quantities along with an associated price per product for each of the quantity ranges (e.g. for product quantities in the range of 0-10 the price may be $5.00 per product, for product quantities in the range of 11-20 the associated price may be $4.00 per product, etc.) The quantity ranges and prices may be determined based upon almost any factor desired including the price paid by operators of NBPS 100 to product supplier 180 or any volume discounts offered by product supplier 180 to operators of NBPS 100, etc. Campaign data may also include data related to product supplier 180, such as the price per product which operators of NBPS 100 pay to product supplier 180, an order minimum per buyer, etc.

One or more billing options may also be determined and included in the parent campaign data. In one embodiment, as the campaign may be distributed to buyers across multiple organizations 132 it may be desirable to specify that each buyer should pay for their own order using their own credit card or other payment methodology.

Once all desired parent campaign data is determined a default campaign interface corresponding to the parent campaign may be created at step 430. This default interface may be a web page associated with the parent campaign which will be accessed by potential buyers and through which potential buyers may place orders. Thus, this default campaign page may include a header or a blurb describing the product being offered in conjunction with the parent campaign, the campaign expiration date, a counter indicating the current aggregate quantity of the product purchased, the current savings per unit of product based upon the current aggregate quantity, an image of the product with a generic picture showing where any provided artwork may go (e.g. "Your logo here"), possible values for certain product attributes, buyer options and instructions, disclaimers or any other information which it is desired to include, etc.

In one embodiment, this default campaign page may be created from a standard template for campaign pages utilizing campaign administration application 260 and stored in association with the parent campaign in campaign database 240. One example of interfaces which may be presented by administration application 260 and utilized in the formation of a campaign page is depicted in FIGS. 8A and 8B.

At any time during the parent campaign (e.g. while the parent campaign is being conducted) one or more organization specific campaigns may be initiated at step 432. An organization specific campaign may be initiated for a variety of reasons. For example, a marketing director or another person at a specific organization 132 may wish to obtain a promotional product in conjunction with an event or a project with an organization, to offer to vendors or for a wide variety of other reasons. To this end they may contact a salesperson affiliated with NBPS 100, this salesperson may determine that a campaign involving the product has been initiated with respect to one or more other organizations (or is about to be initiated by another salesperson, etc.) and may wish to offer buyers within the organization an opportunity of purchase the product in association with the parent campaign. It may be the case, however, that it is desired to give buyers within that organization the opportunity to purchase in association with the parent campaign on a different set of terms than the default terms associated with the campaign (e.g. a different expiration date, tiered pricing matrix, etc.). Consequently, an organization specific campaign may be created and associated both with a particular organization 132 and the campaign itself.

Alternatively, a salesperson affiliated with NBPS 100 may, of their own volition, wish to offer the opportunity to purchase a product in association with a campaign to an organization, for example, based upon an analysis of the organization's 132 previous purchase history, event schedule or other information associated with the organization. However, it is desired to give buyers within that organization the opportunity to purchase in association with the campaign on a different set of terms than the default terms of associated with the campaign (e.g. a different expiration date, tiered pricing matrix, etc.). For example, in certain cases it may be possible to vary the profit margin obtained by operators of NBPS 100 in conjunction with various purchases made in association with the same campaign by providing different pricing matrices in conjunction with different organizations. Here as well an organization specific campaign may be created and associated both with a particular organization 132 and the parent campaign itself.

After an organization specific campaign is initiated, data relating to the organization specific campaign may be determined at step 434. This data may be obtained be a salesperson or administrator through a consultation with one or more people at the organization 132 associated with the organization specific campaign, provided by one or more people at the corresponding organization 132, determined from an analysis of data related to organization 132 or buyers within organization 132 (e.g. in company/buyer database 220), determined by an analysis of attributes of a product related to the initiated campaign (e.g. in product database 230), determined unilaterally by someone affiliated with organization 132 or a salesperson or administrator affiliated with NBPS 100, or by another means altogether. The organization specific data may also be based upon the parent campaign data. In other words, determining organization specific campaign data may entail utilizing at least a portion of the default data determined in association with the parent campaign, such as the default pricing matrix, the campaign expiration date, etc. Once this data is determined it may be, for example, associated with the initiated organization specific campaign in campaign database 240 (and hence associated with a campaign as well).

The organization specific campaign data may include an organization specific expiration date indicating a time period during which buyers associated with the organization for which that organization specific campaign is intended may make purchases in association with the campaign. Again, an organization specific expiration date may be chosen for a variety of reasons, such as the day an event is to occur, a project is to complete, a sale of the product from supplier 180 to operators of NBPS 100 is to end, etc. For example, it may be desired to only offer the opportunity to purchase a product in association with the campaign to buyers within a particular organization for a limited amount of time to drive sales. Thus, in this case an organization specific expiration data occurring sooner than the default expiration date for the campaign may be chosen for an organization specific campaign. Alternatively, as discussed above the campaign expiration date associated with parent campaign may also be utilized as the organization specific campaign date.

Other organization specific campaign data may include artwork to be included in that organization specific campaign (e.g. placed on the product associated with the campaign). This artwork may include logos, slogans, etc. and one or more related placement locations (e.g. where the artwork is to be placed on the product). As discussed above, in certain embodiments it may be desired to control the user of organization's logos, slogans, trademarks, etc. In cases such as these, any artwork may be provided by someone at organization 132 along with a set of instructions for utilizing the artwork such that it can be ensured that proper control of the artwork with respect to the desires of organization 132 may be maintained.

An organization specific pricing matrix for the product may also be included in the campaign data. The organization pricing matrix may differ from the default pricing matrix associated with the campaign, where the determination of the quantity ranges and prices of a specific pricing matrix to utilize in conjunction with a particular organization 132 may include a wide variety of considerations, including the size of the organization, the cost of the product, the desired or anticipated profit with respect to the sale of the product with respect to the organization 132, etc. Alternatively, as discussed above the default pricing matrix associated with parent campaign may also be utilized as the organization specific pricing matrix.

Through consultation with someone affiliated with the organization 132 for which the organization specific campaign is being initiated one or more billing options may also be determined and included in the campaign data. These billing options may allow someone at organization 132 to specify that each buyer should pay for their own order using their own credit card, to give one credit card such that all orders may be billed to that credit card, may specify whether one or more invoices is to be created in conjunction with the campaign, etc.

Once all desired organization specific campaign data is determined an interface corresponding to the organization specific campaign may be created at step 436. This interface may be a web page associated with organization specific campaign which will be accessed by potential buyers at the organization for which the organization specific campaign is being initiated and through which potential buyers at that organization may place orders. Thus, the organization specific campaign page may include a header or a blurb describing the product being offered in conjunction with the campaign, the organization specific expiration date of the campaign if one has been specified (otherwise the default expiration date for the campaign may be used), the organization specific pricing matrix (otherwise the default matrix may be used). The organization specific campaign page may also include a counter indicating the current aggregate quantity of the product purchased by buyers within the organization, in association with the entire campaign, or some combination. Additionally, the current savings per unit of product, where the current savings may be based on a variety of factors (e.g. default or organization specific pricing matrix, aggregate quantity under the campaign, organizational quantity purchased, etc.), an image of the product with or without any supplied artwork, possible values for certain product attributes, buyer options and instructions, disclaimers or any other information desired may also be included. In one embodiment, this organization specific campaign page may be created from a standard template for campaign pages utilizing campaign administration application 260 and stored in association with the campaign in campaign database 240.

A set of potential buyers may then be determined at step 440. This set of potential buyers may be people within one or more organizations 132 to whom it is desired to send a communication about the initiated parent campaign. A set of potential buyers may be determined in almost any manner desired, including having someone affiliated with an organization 132 provide them, determining them through an analysis of company/buyer database 220 (e.g. by comparing previous purchases with the initiated campaign, people working on a project with a project associated with the initiated campaign, etc.).

The initial set of potential buyers may be determined using recipient filter application 280, associated with the parent campaign in campaign database 240 and additionally may be associated with an organization specific campaign in campaign database 240 (e.g. a buyer at an organization may be associated with an organization specific campaign corresponding to the organization). One example of an interface which may be presented by recipient filter application 280 and used in determining the initial set of potential buyers is depicted in FIG. 9.

A notification regarding the campaign may be sent to each of the initial set of potential buyers at step 450. This notification may indicate a way for a potential buyer to access an interface for interacting with campaigns provided by buyer application 270 and in particular may provide information to a user on how to access an interface corresponding to the campaign itself. This notification may, for example, be an email which contains a link to the campaign page, as discussed above. Thus, to access the campaign page a potential buyer may only have to open an email and click on the included link. Specifically, in one embodiment, a potential buyer at an organization 132 may be sent an email with a link to the organization specific campaign interface associated with his organization if it exists while otherwise the potential buyer is sent an email with a link to the default campaign interface. Of course, in other embodiments, other communication methodologies for providing the set of potential buyers with a means to access buyer application 290, the campaign page or an organization specific campaign page may also be utilized.

Moving on to FIG. 5, at some point a potential buyer may access an interface corresponding to the campaign (e.g. a default campaign interface or an organization specific interface) at step 510. In one embodiment, this may occur by clicking on the link provided in the email sent to the potential buyer. This access may be recorded and associated with the potential buyer or campaign in campaign database 270 (e.g. as "Received" or "Reviewed") by buyer application 280 or campaign administrator application 260. At this point the interface corresponding to the parent campaign may be presented to the potential buyer at step 520. The interface may be, for example, the default campaign page corresponding to the parent campaign or an organization specific page associated with the parent campaign and presented by buyer application 290. One example of such a campaign page is depicted in FIG. 10.

In one embodiment, a web page corresponding to the campaign (e.g. the default campaign page or an organization specific page) may present a potential buyer with a set of information regarding the parent campaign or the organization specific campaign, including an image of a product being offered for sale in conjunction with the parent campaign (which may include artwork specific to the organization if the web page is an organization specific page), a pricing matrix comprising quantity ranges and an associated price per unit for each quantity range (e.g. the default pricing matrix or an organization specific pricing matrix), an expiration date or time (e.g. campaign expiration date or organization specific expiration date), and a current campaign status, where the current status may denote the current aggregate quantity of products purchased (e.g. a quantity corresponding to each of the orders already placed or confirmed in conjunction with the campaign or the organization), the price per product associated with the current aggregate quantity or the savings per product purchased. The web page may also comprise other information such as the minimum quantity that may be ordered by the buyer or an increment quantity by which the potential buyer should order (e.g. a potential buyer may only purchase in groups of 24). The web page may be designed to only accept orders which conform to these minimum or increment quantities, for example the web page may automatically increment the quantity ordered by the increment quantity.

The presented interface may also offer the potential buyer a number of options. A potential buyer may choose to contact a salesperson associated with the parent or organization specific campaign at step 512, which may result in a contact method, such as an email box or a phone number, being provided to the potential buyer at step 514. An example of interfaces which may be presented (e.g. by buyer application 290) to a user when he chooses to contact a salesperson is depicted in FIGS. 11A and 11B.

Figure 12:
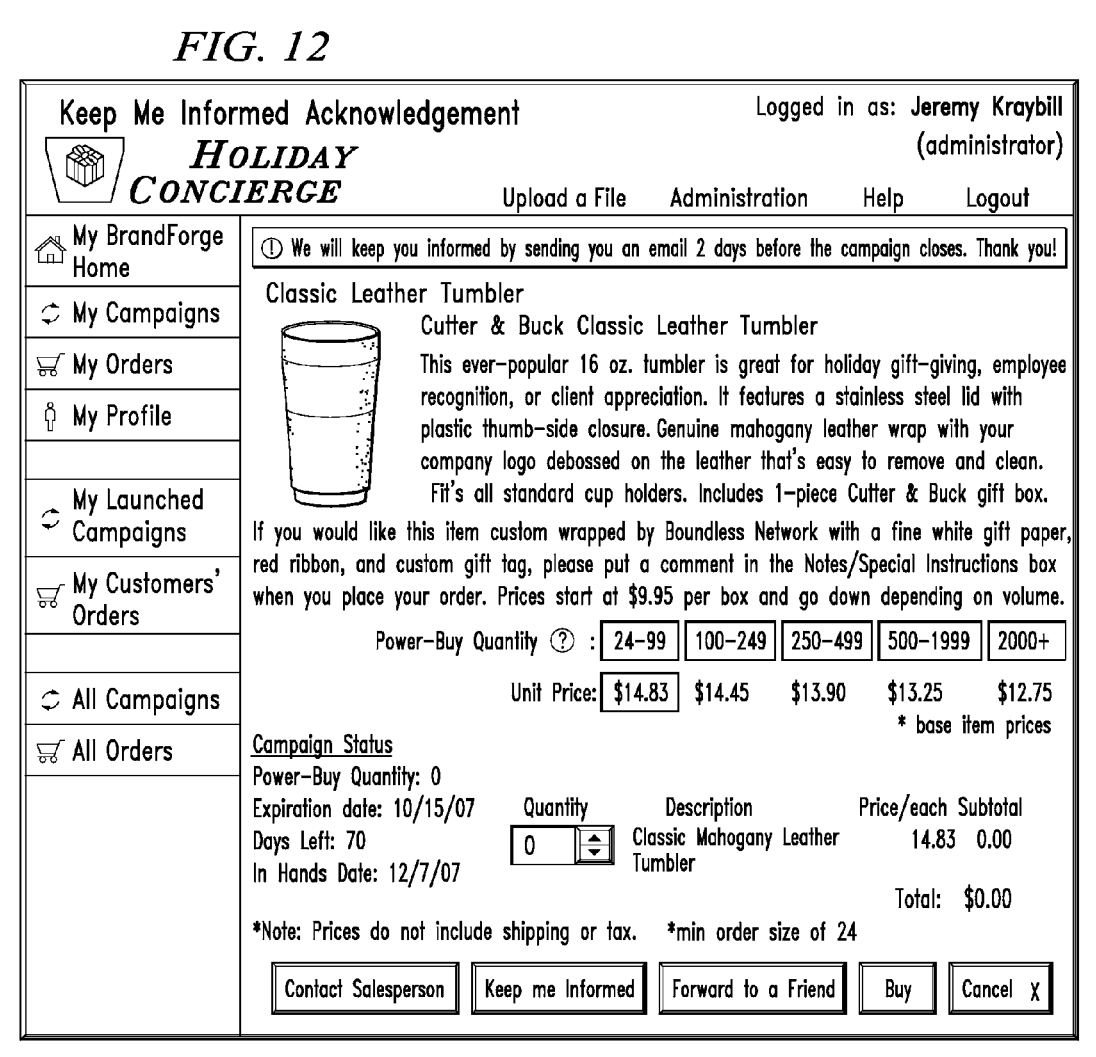

Alternatively a potential buyer may choose to be kept informed of developments which occur with respect to the parent or organization specific campaign at step 516. This information may be recorded in campaign database 230 such that buyer application 270 may notify the potential buyer of the occurrence of certain events (e.g. may send an email or the like to the potential buyer upon the occurrence of an event) that occur in conjunction with the parent or organization specific campaign. After selecting to be kept informed the potential buyer may then be presented with an interface at step 518 confirming his desire to be kept informed of events occurring in conjunction with the campaign. An example of interfaces which may be presented to a user when he chooses to be kept informed is depicted in FIG. 12.

Figure 13A:
FIGS. 13A and 13B are examples of interfaces for use with embodiments of systems and method for network based purchasing.
Figure 13B:
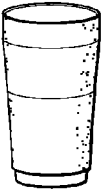

A potential buyer may also choose to forward the campaign to another potential buyer at step 520. In this case, the potential buyer may be presented with an interface which allows the potential buyer to notify another potential buyer of the campaign, for example, by sending an email to the other potential buyer comprising a link to the web page corresponding to the campaign (e.g. the default campaign page or an organization specific campaign page). In one embodiment, a potential buyer may forward the campaign only to others who are in the same organization 132 thus any potential recipients of a forwarded campaign may be examined to ensure that they belong to the same organization as the potential buyer who is forwarding the campaign. Once the potential buyer has forwarded the campaign to another potential buyer an interface may be presented at step 522 acknowledging or confirming that the campaign has been forwarded. An example of interfaces which may be presented to a user when he forwards the campaign is depicted in FIGS. 13A and 13B.

At some point the potential buyer may choose to place an order at step 530. Referring now to FIG. 6, a flow diagram for one such method of placing an order is depicted. When a user chooses to place an order at step 530 it can be determined at step 610 if the potential buyer is a registered user (e.g. has a user account or has signed in to buyer application 270). If the potential buyer is not a registered user or has not signed in the user may sign in at step 620. A sign-in page may be presented to the potential buyer or, if the user is not registered, the potential buyer may go through a registration process before signing in.

Once the user is signed in the user may enter an order in association with the campaign at step 630. More specifically, in one embodiment the potential buyer may be presented with a checkout interface which may allow a potential buyer to enter billing information (e.g. a "Bill To" address), shipping information (e.g. a "Ship To" address) or other information pertinent to the order or campaign. In particular, the order page may present the potential buyer with payment options based upon the billing options specified during creation of the campaign. For example, if the creator of the parent or organization specific campaign specified that there will be only a single invoice for the campaign, the user may not be presented with any payment options while if one invoice per buyer has been specified for the parent or organization specific campaign the potential buyer may be provided with places to enter his credit card information. Other payment options are contemplated and will work with equal efficacy. An example of interfaces which may be used to place an order is depicted in FIGS. 14A, 14B and 14C.

Once the potential buyer has entered and submitted his order, this order may be recorded at step 640. When an order is recorded it may be stored (e.g. in order database 250) and associated both with the parent or organization specific campaign and the potential buyer who placed the order. The order may also be assigned a status of pending. After the order is recorded at step 640 it may be submitted for approval at step 650. The approval process may allow the order to be manually confirmed by someone involved in the campaign to ensure that the order should be fulfilled. Thus, an order may be reviewed for a variety of reasons, for example, to verify that the potential buyer who placed the order should be allowed to place the order (e.g. is the potential buyer within the company), that the pricing or quantity ordered can be fulfilled or for almost any other reason desired. To obtain approval for the order the order may be presented to a salesperson or administrator when the administrator or salesperson access an interface which presents them with their customer's orders or views orders associated with the parent or an organization specific campaign. When the salesperson or administrator views the order an indicator may be presented along with the order information where this indicator denotes that the order is pending. Example of interfaces which may be presented (e.g. by buyer application 290, campaign administration application 260, etc.) to a buyer, salesperson or administrator which may be used to view associated campaigns or orders are depicted in FIGS. 15A-15D.

If the order is not approved at step 660 the order may be assigned a cancelled status and a communication (e.g. email) sent to the potential buyer informing him of this cancellation at step 670. If, however, the order is verified and accepted, at step 680 the order may be assigned an approved status and committed at step 690. When an order is committed the quantity of product purchased with respect to that order is added to the aggregate quantity purchased associated with that campaign at step 692. The default campaign web page or an organization specific page may then be updated based upon this updated aggregate quantity purchased at step 694.

Updating the default campaign page may, for example, entail the update of the aggregate purchase quantity displayed on the page, the current price per product displayed to a potential buyer, the savings per product displayed to a potential buyer or any other information associated with the page which may be affected by a committed order. Thus, as can be seen, whenever a potential buyer subsequently accesses the default web page for the parent campaign the updated campaign page will be displayed to that potential buyer. Consequently, as potential buyers place orders in association with that campaign and those orders are accepted and committed, the default campaign page is updated during the course of the campaign such that the current status of the campaign is reflected to potential buyers who subsequently access the campaign web page.

Similarly, if the buyer who placed the committed order is affiliated with an organization for which an organization specific campaign has been initiated the organization specific campaign page associated with that buyer's organization may be updated as well. This update may, in turn, entail the update of a purchase quantity displayed on the page (e.g. the aggregate quantity or an organization specific quantity, etc.), the current price per product displayed to a potential buyer, the savings per product displayed to a potential buyer or any other information associated with the page which may be affected by committed order. Thus, as can be seen, whenever a potential buyer subsequently accesses the organization specific page for the parent campaign associated with his organization the updated organization specific campaign page will be displayed to that potential buyer. Consequently, as orders are placed in association with that campaign and those orders are accepted and committed, both the default campaign page and any pertinent organization specific campaign pages may be updated such that the current status of the parent or organization specific campaign is reflected to potential buyers who subsequently access interfaces corresponding to the campaign.

Moving on to FIG. 7, eventually the campaign expiration date or time for the parent campaign is reached. Before the campaign expiration date occurs, however, in one embodiment a communication (e.g. email) may be sent to all potential buyers who have viewed the campaign (e.g. any of the web pages associated with the campaign) to remind them that the parent campaign is coming to an end. This reminder may be further tailored based upon an organization specific campaign expiration date associated with a buyer's organization (e.g. the communication may be sent two days before the occurrence of the organization specific expiration date associated with the buyer's organization). When the campaign expiration date actually occurs then, confirmation of buyers may take place at step 710 to make certain that the buyers who placed orders (or whose orders were committed) actually want to make the purchase commensurate with their order. Thus, a communication such as an email or phone call may be made to all buyers whose orders were committed in association with the campaign to allow the buyer to confirm, adjust or cancel his order. After these confirmation communications are made at step 710 the results may be taken into account to determine a finalized aggregate purchase quantity and associated finalized price for the parent campaign at step 720. In other words, the current aggregate purchase quantity determined through accumulation of the quantities from each of the committed orders may be adjusted upward or downward if any of the buyers adjusted the quantity which they desire to purchase (and which they submitted in their original order). This finalized aggregate purchase quantity may then be used to determine the associated finalized price for the campaign using the default pricing matrix associated with the campaign (e.g. the price corresponding to the quantity range into which the finalized aggregate purchase quantity falls may be the finalized price for the campaign) or an organization specific pricing matrix.

After any adjustments are made at step 720 and the finalized aggregate purchase quantity and price are determined a notification may be sent to all buyers whose orders were committed and confirmed at step 730. This notification may comprise an email or phone call which relates the specifics of the buyer's order along with information related to the campaign, such as the finalized aggregate purchase quantity (e.g. with respect to the campaign or that buyer's organization 132), the finalized price (e.g. again with respect to the campaign or that buyer's organization 132), the savings realized, estimated arrival time of the product, etc.

Additionally, after any adjustments are made at step 720 and the finalized aggregate purchase quantity and price are determined an order for the campaign may be created at step 740. This campaign order may comprise one or more orders to be placed with product supplier 180 by operators of NBPS 100 in accordance with the campaign where the campaign order is determined using the confirmed and adjusted orders placed by the buyers.

In one embodiment it may be desired to track orders based upon a "Ship To" address provided by a buyer or otherwise associated with an order or the campaign. To accomplish this attributes of a campaign may be analyzed at step 750 to determine a list of attributes germane to the campaign order. For example, attributes of the product which may vary based upon an order for example, color, size, location of logo placement, etc. Using these attributes a standard order template may be created at step 760. This standard order template may be for example, in a spreadsheet format comprising a column for quantity and for each of the various attributes. At step 770 then, each of the orders with the same "Ship To" address may be consolidated. This consolidation process may comprise creating a single campaign order using each of the buyer orders with the same "Ship To" address. Specifically, in one embodiment, the standard order template may be cloned and the correct information placed in each column of the spreadsheet (e.g. one row might be quantity 2, color red and size XL while a second row might be quantity 6, color blue and size M).

This set of campaign orders may then be submitted to product supplier 180 at step 780 such that the campaign order may be fulfilled and the products delivered to the buyers (e.g. at the "Ship To" address specified in the campaign order). In one embodiment, to facilitate processing, collection or tracking of these orders portions of the creation of campaign orders or the recording and submission of these campaign orders may be handled by an ordering processing system which may be a distinct application or system from NBPS 100.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for network based purchasing, comprising: providing a network based purchasing system having a computer processor, coupled to a set of computing devices affiliated with one of a plurality of organizations;
   providing a location on a network, wherein the location presents the opportunity to purchase a base product customized according to buyer preferences;
   accepting a first order from a first buyer through the location prior to an expiration date, wherein the first order includes a first quantity of the base product customized according to product design options specified by the first buyer;
   associating a first price with the first quantity based on a first tiered pricing matrix, wherein the first tiered pricing matrix includes ranges of quantities and associated prices;
   accepting a second order from a second buyer through the location prior to the expiration date, wherein the second order includes a second quantity of the base product customized according to product design options specified by the second buyer, wherein the product design options specified by the second buyer are different than the product design options specified by the first buyer;
   associating a second price with the second quantity based on a second tiered pricing matrix, wherein the second tiered pricing matrix includes ranges of quantities and associated prices and further wherein the associated prices in the second tiered pricing matrix are different than the associated prices in the first tiered pricing matrix;
   determining an aggregate purchase quantity by aggregating the first quantity of the base product customized according to the product design options specified by the first buyer and the second quantity of the base product customized according to the product design options specified by the second buyer;
   determining, using a computer processor, a revised first price based on the aggregate purchase quantity and the first tiered pricing matrix, wherein the revised first price is lower than the first price; and
   charging the first buyer the revised first price for the first quantity of the base product customized according to the product design options specified by the first buyer.

2. The method of claim 1, further comprising creating an order configured to be placed with a product supplier to purchase the aggregate purchase quantity of the product after the expiration date, and the first quantity of the base product customized according to the product design options specified by the first buyer and the second quantity of the base product customized according to the product design options specified by the second buyer are not manufactured until the campaign order is placed with the product supplier.

3. The method of claim 2, where the first buyer's product design options are provided by the first buyer and the second buyer's product design options are provided by the second buyer.

4. The method of claim 3, wherein the first buyer's product design options comprises artwork associated with the first buyer and the second buyer's product design options comprises artwork associated with the second buyer.

5. The method of claim 1, wherein the first quantity of the base product is supplied by a first product supplier and the second quantity of the base product is supplied by a second product supplier.

6. The method of claim 1, wherein the aggregate purchase quantity of the base product is supplied by a first supplier and the first quantity of the product is customized according to the first buyer's product design options by a second supplier and the second quantity of the product is customized according to the second buyer's product design options by a third supplier.

7. The method of claim 6, wherein the second supplier and the third supplier are different.

8. The method of claim 1, further comprising:
   creating a parent campaign, where the parent campaign is associated with the base product and the expiration date;
   creating a first organization specific campaign associated with the parent campaign, where the first organization specific campaign is associated with a first organization, the first tiered pricing matrix and the first buyer's product design options;
   creating a second organization specific campaign associated with the parent campaign, where the second organization specific campaign is associated with a second organization, a second expiration date, the second tiered pricing matrix and the second buyer's product design options, wherein the first buyer is associated with the first organization, the second buyer is associated with the second organization and the location comprises a first location and a second location, wherein the first location is a first organization specific campaign location associated with the first organization specific campaign and the first organization specific campaign location presents the first tiered pricing matrix and the product design options specified by the first buyer, and the first buyer ordered the first quantity of the base product using the first organization specific location, and wherein the second location is a second organization specific campaign location associated with the second organization specific campaign and the second organization specific campaign location presents the second tiered pricing matrix and the product design options specified by the second buyer, and the second buyer ordered the second quantity of the base product using the second organization specific location.

9. The method of claim 8, wherein the first buyer comprises multiple buyers and the second buyer comprises multiple buyers.

10. The method of claim 1, wherein the first quantity is the same as the second quantity.

11. The method of claim 1, wherein the first quantity is different than the second quantity.

12. The method of claim 1, wherein the first price and the second price are the same.

13. A system for network based purchasing, comprising:
a network based purchasing computer having a processor executing instructions embodied on a non-transitory computer readable medium, the instructions configured to implement:
  a buyer application operable for providing a location on a network, wherein the location presents the opportunity to purchase a base product customized according to buyer preferences; and
  an order management application configured for:
    accepting a first order from a first buyer through the location prior to an expiration date, wherein the first order includes a first quantity of the base product customized according to product design options specified by the first buyer;
    associating a first price with the first quantity based on a first tiered pricing matrix, wherein the first tiered pricing matrix includes ranges of quantities and associated prices;
    accepting a second order from a second buyer through the location prior to the expiration date, wherein the second order includes a second quantity of the base product customized according to product design options specified by the second buyer, wherein the product design options specified by the second buyer are different than the product design options specified by the first buyer;
    associating a second price with the second quantity based on a second tiered pricing matrix, wherein the second tiered pricing matrix includes ranges of quantities and associated prices and further wherein the associated prices in the second tiered pricing matrix are different than the associated prices in the first tiered pricing matrix;
    determining an aggregate purchase quantity by aggregating the first quantity of the base product customized according to the product design options specified by the first buyer and the second quantity of the base product customized according to the product design options specified by the second buyer;
    determining, using a computer processor, a revised first price based on the aggregate purchase quantity and the first tiered pricing matrix, wherein the revised first price is lower than the first price; and
    charging the first buyer the revised first price for the first quantity of the base product customized according to the product design options specified by the first buyer.

14. The system of claim 13, further comprising creating an order configured to be placed with a product supplier to purchase the aggregate purchase quantity of the product after the expiration date, and the first quantity of the base product customized according to the product design options specified by the first buyer and the second quantity of the base product customized according to the product design options specified by the second buyer are not manufactured until the campaign order is placed with the product supplier.

15. The system of claim 14, where the first buyer's product design options are provided by the first buyer and the second buyer's product design options are provided by the second buyer.

16. The system of claim 15, wherein the first buyer's product design options comprises artwork associated with the first buyer and the second buyer's product design options comprises artwork associated with the second buyer.

17. The system of claim 13, wherein the first quantity of the base product is supplied by a first product supplier and the second quantity of the base product is supplied by a second product supplier.

18. The system of claim 13, wherein the aggregate purchase quantity of the base product is supplied by a first supplier and the first quantity of the product is customized according to the first buyer's product design options by a second supplier and the second quantity of the product is customized according to the second buyer's product design options by a third supplier.

19. The system of claim 18, wherein the second supplier and the third supplier are different.

20. The system of claim 13, further comprising an campaign administration application operable for:
creating a first organization specific campaign associated with the parent campaign, where the first organization specific campaign is associated with a first organization, the first tiered pricing matrix and the first buyer's product design options;
creating a second organization specific campaign associated with the parent campaign, where the second organization specific campaign is associated with a second organization, a second expiration date, the second tiered pricing matrix and the second buyer's product design options,
wherein the first buyer is associated with the first organization, the second buyer is associated with the second organization and the location comprises a first location and a second location,
wherein the first location is a first organization specific campaign location associated with the first organization specific campaign and the first organization specific campaign location presents the first tiered pricing matrix and the product design options specified by the first buyer, and the first buyer ordered the first quantity of the base product using the first organization specific location, and
wherein the second location is a second organization specific campaign location associated with the second organization specific campaign and the second organization specific campaign location presents the second tiered pricing matrix and the product design options specified by the second buyer, and the second buyer ordered the second quantity of the base product using the second organization specific location.

21. The system of claim 20, wherein the first buyer comprises multiple buyers and the second buyer comprises multiple buyers.

22. The system of claim 13, wherein the first quantity is the same as the second quantity.

23. The system of claim 13, wherein the first quantity is different than the second quantity.

24. The system of claim 13, wherein the first price and the second price are the same.

* * * * *